(12) United States Patent
Guo et al.

(10) Patent No.: US 10,071,412 B2
(45) Date of Patent: Sep. 11, 2018

(54) METHOD FOR ASSEMBLING PRODUCTS IN DIE

(71) Applicant: CHENGDU HOMIN TECHNOLOGY CO., LTD, Chengdu (CN)

(72) Inventors: Junjie Guo, Chengdu (CN); Guofu Tian, Chengdu (CN); Jian You, Chengdu (CN); Yan Zhuang, Chengdu (CN); Yi Guo, Chengdu (CN); Bin Teng, Chengdu (CN)

(73) Assignee: CHENGDU HOMIN TECHNOLOGY CO., LTD, Chengdu (CN)

( * ) Notice: Subject to any disclaimer, the term of this patent is extended or adjusted under 35 U.S.C. 154(b) by 0 days.

(21) Appl. No.: 15/328,030

(22) PCT Filed: May 25, 2016

(86) PCT No.: PCT/CN2016/083228
§ 371 (c)(1),
(2) Date: Jan. 22, 2017

(87) PCT Pub. No.: WO2016/188417
PCT Pub. Date: Dec. 1, 2016

(65) Prior Publication Data
US 2017/0209913 A1   Jul. 27, 2017

(30) Foreign Application Priority Data
May 28, 2015   (CN) .......................... 2015 1 0281195

(51) Int. Cl.
*B21D 43/04*   (2006.01)
*B21D 39/03*   (2006.01)
(Continued)

(52) U.S. Cl.
CPC ............. *B21D 39/03* (2013.01); *B21D 37/10* (2013.01); *B21K 25/00* (2013.01); *B21D 43/027* (2013.01);
(Continued)

(58) Field of Classification Search
CPC ...... B21D 43/027; B21D 37/10; B21D 39/00; B21D 45/04; B21D 43/22;
(Continued)

(56) References Cited

U.S. PATENT DOCUMENTS 5,826,323 A * 10/1998 Walters .................... H02K 1/12
29/564.6
2011/0232076 A1* 9/2011 Matsubara ............. B21D 28/02
29/564

FOREIGN PATENT DOCUMENTS

CN   201432056 Y  *  3/2010
CN   101804697 A     8/2010
(Continued)

OTHER PUBLICATIONS

English Translation of CN 201432056Y.*

*Primary Examiner* — Sunil K Singh
*Assistant Examiner* — Yasir Diab
(74) *Attorney, Agent, or Firm* — Gokalp Bayramoglu

(57) ABSTRACT

The present invention discloses a method for assembling products in a die by the aid of a device for assembling products in a die. The device for assembling products in the die comprises a pushing portion and an assembling portion. The pushing portion comprises a pushing block (11), a pushing spring (10) and a pushing wedge (9), wherein the pushing block (11) is connected with the pushing spring (10), and the pushing wedge (9) is arranged above the pushing block (11) and is in wedge-shaped connection with the pushing block (11). The assembling portion comprises an (Continued)

assembling wedge (6), a transmission wedge (4) and an assembling male die (5), wherein the transmission wedge (4) is in wedge-shaped connection with the assembling male die (5), and the transmission wedge (4) and the assembling male die (5) are arranged in a lower base (2).

8 Claims, 2 Drawing Sheets

(51) Int. Cl.
    *B21D 37/10*      (2006.01)
    *B21K 25/00*      (2006.01)
    *B21D 45/04*      (2006.01)
    *B21D 43/02*      (2006.01)

(52) U.S. Cl.
    CPC ........... *B21D 45/04* (2013.01); *Y10T 29/5138* (2015.01); *Y10T 29/5143* (2015.01)

(58) Field of Classification Search
CPC ........... Y10T 156/1056; Y10T 156/107; Y10T 29/5192; Y10T 29/5138; Y10T 29/5143; H01F 41/02; H01F 41/0206; H01F 41/0213; H01F 41/022; H01F 41/0226; H01F 41/0233; H01F 41/024; H01F 41/0246; H01F 41/0253; H01F 41/026; H02K 15/02; H02K 15/022; H02K 15/024; H02K 15/026; H02K 15/028
USPC .......................... 83/463, 464, 435.25, 437.6
See application file for complete search history.

(56) References Cited

FOREIGN PATENT DOCUMENTS

| | | | |
|---|---|---|---|
| CN | 201900179 U | * | 7/2011 |
| CN | 202087705 U | | 12/2011 |
| CN | 102513452 A | * | 6/2012 |
| CN | 102950772 A | | 3/2013 |
| CN | 203725643 U | | 7/2014 |
| CN | 204183768 U | | 3/2015 |
| CN | 104841783 A | | 8/2015 |
| CN | 104858308 A | | 8/2015 |
| CN | 204672812 U | | 9/2015 |
| CN | 105834300 A | * | 8/2016 |
| JP | 2014180671 A | | 9/2014 |

* cited by examiner

METHOD FOR ASSEMBLING PRODUCTS IN DIE

CROSS REFERENCE TO RELATED APPLICATIONS

This application is the national phase entry of International Application No. PCT/CN2016/083228, filed on May 25, 2016, which is based upon and claims priority to Chinese Patent Application No. 201510281195.6 filed on May 28, 2015, the entire contents of which are incorporated herein by reference.

TECHNICAL FIELD

The present invention relates to a production method, in particular to a method for assembling products in a die.

BACKGROUND ART

Under the conditions of the prior art, small parts are produced in a form of single line and are concentratively assembled finally in a form of artificial assembly. When products are produced in a large batch, such production mode not only causes low production efficiency and brings large labor intensity for workers, but also is likely to damage parts in the assembly process and not advantageous for the development of enterprises.

SUMMARY OF INVENTION

Technical Problem

The present invention aims to overcome the defects of the prior art and provide a method for assembling products in a die. This method can realize automatic assembly to improve the production efficiency.

Solution to the Problem

Technical Solution

The objective of the present invention is realized by the following technical solution: a method for assembling products in a die by the aid of a device for assembling products in a die is provided. The device for assembling products in the die comprises a pushing portion and an assembling portion. The pushing portion comprises a pushing block, a pushing spring and a pushing wedge, wherein the pushing block is connected with the pushing spring, the pushing wedge is arranged above the pushing block and is in wedge-shaped connection with the pushing block, the pushing wedge is arranged below an upper base, and the pushing block and the pushing spring are arranged above a lower base. The assembling portion comprises an assembling wedge, a transmission wedge and an assembling male die, wherein the transmission wedge is in wedge-shaped connection with the assembling male die, the transmission wedge and the assembling male die are arranged in the lower base, the transmission wedge is arranged above the assembling male die, the assembling wedge is arranged above the transmission wedge, the assembling wedge is in wedge-shaped connection with the transmission wedge while in contact, the assembling wedge is arranged below the upper base, and a blanking male die is arranged below the upper base.

The method for assembling products in a die comprises the following several procedures:

S1. stamping: performing stamping machining for two strip blanks simultaneously;

S2. feeding: conveying machined parts to an assembling device together with the blanks;

S3. assembling: assembling the parts by using the device for assembling products in a die, specifically comprising the following three steps: blanking, positioning and press-fitting;

S31. blanking: removing the part from one of the blanks by using a blanking male die;

S32. positioning: pushing the removed part to a position below the part on the other blank by using the pushing portion; and S33. press-fitting: assembling the two parts by using the assembling portion.

The blanking and the stamping machining are performed simultaneously.

The press-fitting and the stamping machining are performed simultaneously.

A stamping mechanism moves in a return stroke after the stamping machining is accomplished.

The positioning and return of the stamping mechanism are performed simultaneously.

The transmission wedge is connected to a wedge resetting spring.

The assembling male die is connected to a male die resetting spring which is arranged below the assembling male die and located in the lower base.

Beneficial Effects of the Invention

Beneficial Effects

The present invention has the following advantages:

1. The method can realize the automation of production, improve the production efficiency, relieve the labor intensity for workers and improve the yield of products.

2. The assembling device is simple in structure, convenient to use and convenient for automatic control and has the advantages of control flexibility, high machining precision, high positioning precision of parts and the like.

BRIEF DESCRIPTION OF THE DRAWINGS

Description of the Drawings

Figure 1:
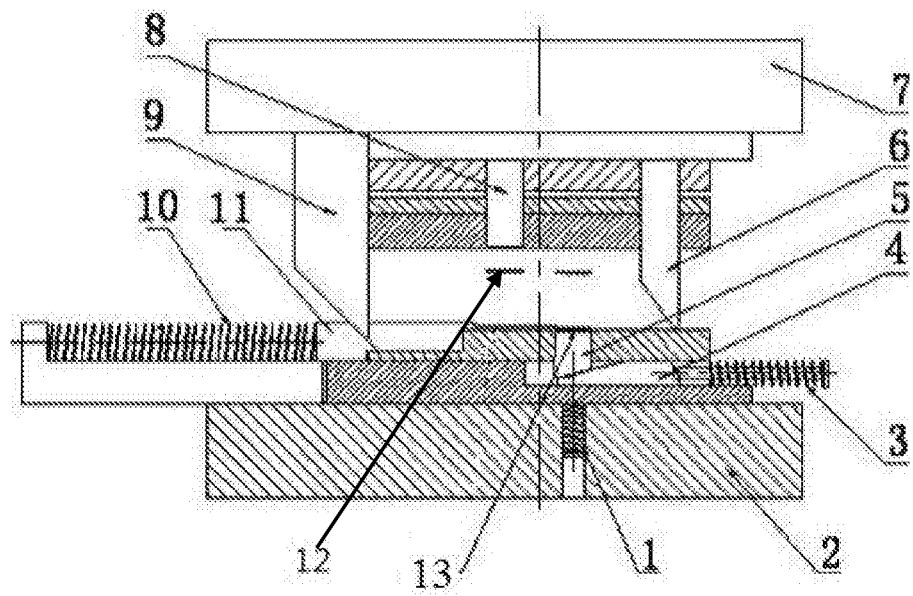
Figure 2:
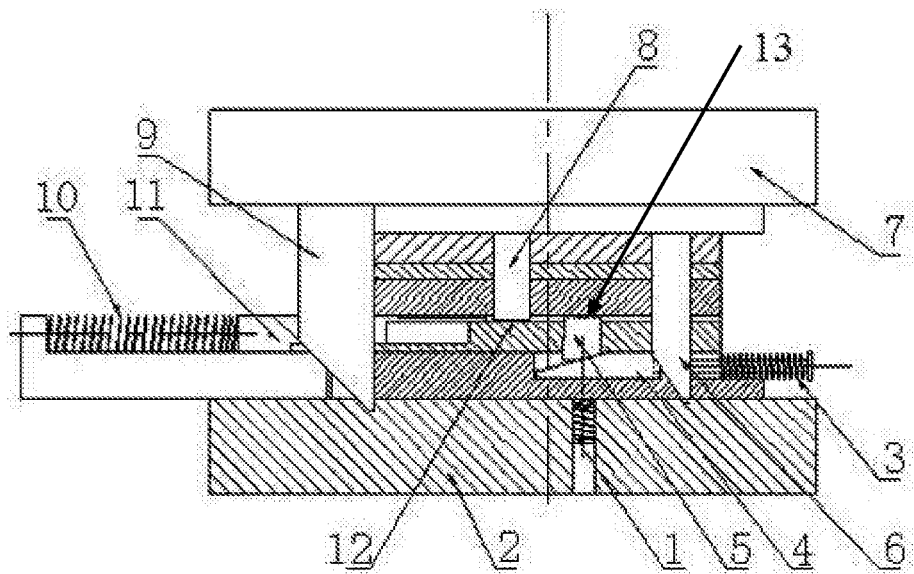
Figure 3:
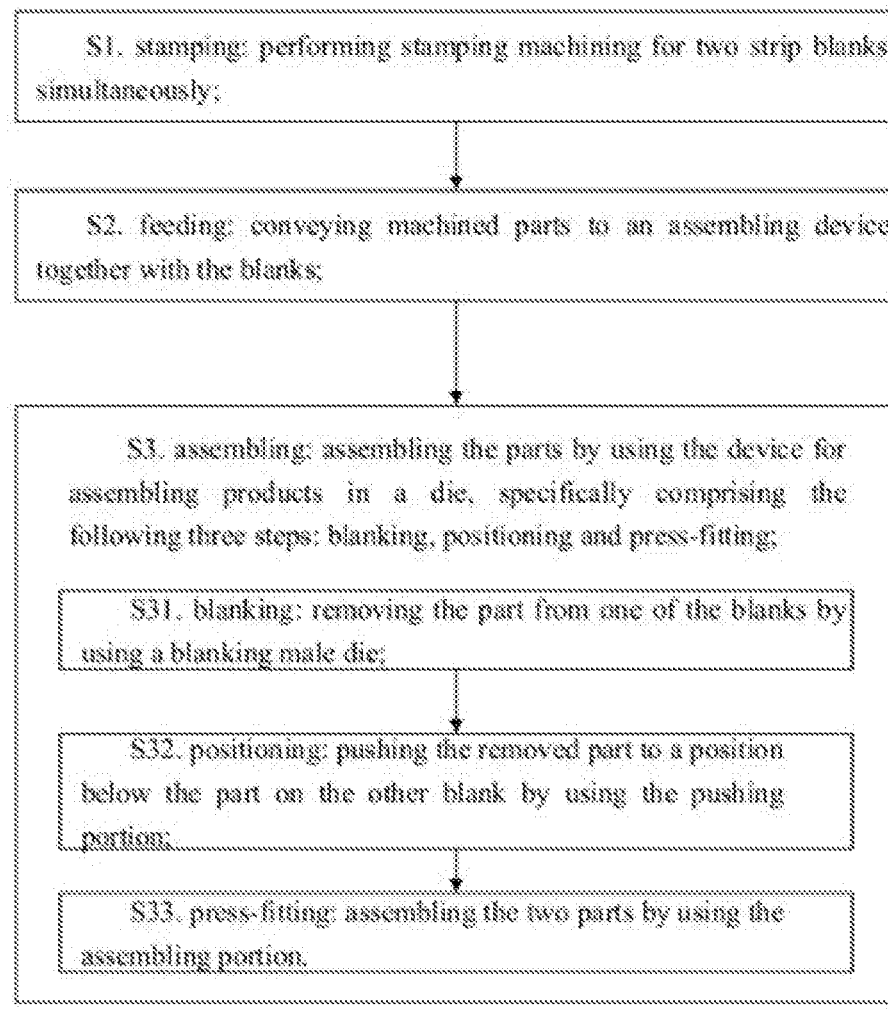

FIG. 1 is a schematic drawing of a die opening structure of the assembling device;

FIG. 2 is a schematic drawing of a die closing structure of the assembling device;

FIG. 3 is a flow chart showing the process of the method for assembling products in a die;

and in drawings, male die resetting spring 1, lower base 2, wedge resetting spring 3, transmission wedge 4, assembling male die 5, assembling wedge 6, upper base 7, blanking male die 8, pushing wedge 9, pushing spring 10, pushing block 11 and part A 12, part B 13 are marked.

DETAILED DESCRIPTION OF THE INVENTION

Implementations of the Present Invention

The present invention will be further described as below in conjunction with the drawings. The protection scope of the present invention is not limited to the following content:

As shown in FIG. 1 and FIG. 2, a device for assembling products in a die used in a method for assembling products in a die comprises a pushing portion and an assembling portion. The pushing portion comprises pushing block 11, pushing spring 10 and pushing wedge 9, wherein pushing block 11 is connected with pushing spring 10, pushing wedge 9 is arranged above pushing block 11 and is in wedge-shaped connection with pushing block 11, pushing wedge 9 is arranged below upper base 7, and pushing block 11 and pushing spring 10 are arranged above lower base 2. In this embodiment, blanking male die 8 is arranged below upper base 7. The assembling portion comprises assembling wedge 6, transmission wedge 4 and assembling male die 5, wherein transmission wedge 4 is in wedge-shaped connection with assembling male die 5, transmission wedge 4 and assembling male die 5 are arranged in lower base 2, and transmission wedge 4 is arranged above assembling male die 5. In this embodiment, transmission wedge 4 is connected to wedge resetting spring 3, assembling male die 5 is connected to male die resetting spring 1, male die resetting spring 1 is arranged below assembling male die 5 and located in lower base 2, assembling wedge 6 is arranged above transmission wedge 4, assembling wedge 6 is in wedge-shaped connection with transmission wedge 4 while in contact, and assembling wedge 6 is arranged below upper base 7.

Please refer to FIG. 3, which is a flow chart showing the process of the method for assembling products in a die. The method for assembling products in a die comprises the following several procedures:

S1. stamping: performing stamping machining on two strip blanks using a stamping mechanism. In this embodiment, stamped parts are reserved on the strip blanks, and the stamping mechanism moves in a return stroke after stamping machining is accomplished;

S2. feeding: conveying machined parts to the assembling device by using a feeding mechanism. As shown in FIG. 1, machined part A 12 is located below the blanking male die 8, and the part B 13 is located above assembling male die 5;

S3. assembling: assembling the parts by using the assembling device, specifically comprising the following three steps: blanking, positioning and press-fitting;

S31. blanking: removing the part from one of the blanks by using the blanking male die. In this embodiment, the blanking and stamping machining are performed simultaneously. When the parts are stamped by equipment, upper base 7 drives blanking male die 8 and the stamping mechanism to move synchronously downwards, upper base 7 pushes the strip blanks and part A 12 and part B 13 on the strip blanks downwards, and part A 12 on the strip blank is removed by blanking male die 8 when upper base 7 moves to a lower limit position. In this process, pushing wedge 9 moves together with upper base 7 and pushes pushing block 11 to move leftward against the thrust of pushing spring 10, and when upper base 7 moves to a lower limit position, pushing block 11 moves to a left limit position, and part A 12 is stamped to the right side of pushing block 11 by blanking male die 8;

S32. positioning: pushing the removed part to an appropriate position by using a pushing device. In this embodiment, the positioning and return of a stamping mechanism are performed simultaneously. When the stamping mechanism is in a return stroke, upper base 7 and the stamping mechanism move synchronously, upper base 7 drives assembling wedge 6, blanking male die 8 and pushing wedge 9 to move upwards in synchronization with the stamping mechanism, pushing wedge 9 is disconnected from pushing block 11, pushing block 11 moves leftward under the thrust of pushing spring 10, the assembling wedge is separated from transmission wedge 4, transmission wedge 4 moves rightwards under the tension of wedge setting spring 3 and is separated from assembling male die 5, and assembling male die 5 moves downwards under the tension of male die resetting spring 1. When upper base 7 moves to an upper limit position, the feeding mechanism conveys machined parts to the assembling device again; and S33. press-fitting: assembling a plurality of parts together by using the assembling device. In this embodiment, the press-fitting and stamping machining are performed simultaneously. When parts are stamped by equipment, upper base 7 drives assembling wedge 6 and stamping mechanism to move synchronously downwards, assembling wedge 6 pushes transmission wedge 4 to move leftwards against the tension of wedge resetting spring 3, transmission wedge 4 pushes assembling male die 5 to move upwards against the tension of male die resetting spring 1, assembling male die 5 contacts part A 12 of the previous procedure in an upward moving process and pushes the same upwards to contact part B 13, and under the extrusion of assembling male die 5 and upper base 7, part A 12 of the previous procedure and part B 13 are assembled together.

What is claimed is:

1. A method for assembling products in a die by aid of a device for assembling products in a die, comprising:
wherein the device for assembling products in the die comprises a pushing portion and an assembling portion; wherein the pushing portion comprises a pushing block, a pushing spring and a pushing wedge, wherein the pushing block is connected with the pushing spring, the pushing wedge is arranged above the pushing block and is in a wedge-shaped connection with the pushing block, the pushing wedge is arranged below an upper base, and the pushing block and the pushing spring are arranged above a lower base; the assembling portion comprises an assembling wedge, a transmission wedge and an assembling male die, wherein the transmission wedge is in the wedge-shaped connection with the assembling male die, the transmission wedge and the assembling male die are arranged in the lower base, the transmission wedge is arranged below the assembling male die, the assembling wedge is arranged above the transmission wedge, the assembling wedge is in the wedge-shaped connection with the transmission wedge while in contact, the assembling wedge is arranged below the upper base, and a blanking male die is arranged below the upper base;

the method for assembling products in a die comprising the following several procedures:

S1, stamping: performing a stamping machining for two strip blanks simultaneously;

S2, feeding: conveying machined parts to the device for assembling products in a die together with blanks;

S3, assembling: assembling parts together using the device for assembling products in a die, specifically comprising the following three steps, namely blanking, positioning and press-fitting;

S31, blanking: removing a part from one of the blanks by using the blanking male die;

S32, positioning: pushing a removed part to a position below a part on an other blank by using the pushing portion;

S33, press-fitting: assembling the two parts together by using the assembling portion.

2. The method for assembling products in a die according to claim 1, wherein the blanking and the stamping machining are performed simultaneously.

3. The method for assembling products in a die according to claim 1, wherein the press-fitting and the stamping machining are performed simultaneously.

4. The method for assembling products in a die according to claim 1, wherein a stamping mechanism moves in a return stroke after the stamping machining is accomplished.

5. The method for assembling products in a die according to claim 1, wherein the positioning and return of the stamping mechanism are performed simultaneously.

6. The method for assembling products in a die according to claim 1, wherein the transmission wedge is connected to a wedge resetting spring.

7. The method for assembling products in a die according to claim 1, wherein the assembling male die is connected to a male die resetting spring which is arranged below the assembling male die and located in the lower base.

8. The method for assembling products in a die according to claim 4, wherein the positioning and return of the stamping mechanism are performed simultaneously.

\* \* \* \* \*